US009563665B2

(12) United States Patent
Chen et al.

(10) Patent No.: US 9,563,665 B2
(45) Date of Patent: Feb. 7, 2017

(54) PRODUCT SEARCH METHOD AND SYSTEM

(71) Applicant: Alibaba Group Holding Limited, George Town (KY)

(72) Inventors: Chao Chen, Hangzhou (CN); Xiaomei Han, Hangzhou (CN); Chao Song, Hangzhou (CN); Hui Wei, Hangzhou (CN)

(73) Assignee: Alibaba Group Holding Limited (KY)

( * ) Notice: Subject to any disclaimer, the term of this patent is extended or adjusted under 35 U.S.C. 154(b) by 623 days.

(21) Appl. No.: 13/894,827

(22) Filed: May 15, 2013

(65) Prior Publication Data

US 2013/0318101 A1    Nov. 28, 2013

(30) Foreign Application Priority Data

May 22, 2012   (CN) .......................... 2012 1 0160827

(51) Int. Cl.
*G06F 17/30*    (2006.01)
*G06Q 30/06*    (2012.01)

(52) U.S. Cl.
CPC ..... *G06F 17/3053* (2013.01); *G06F 17/30643* (2013.01); *G06F 17/30648* (2013.01); *G06F 17/30663* (2013.01); *G06F 17/30684* (2013.01); *G06F 17/30722* (2013.01); *G06Q 30/0627* (2013.01)

(58) Field of Classification Search
CPC ....................... G06F 17/3053; G06F 17/30663
See application file for complete search history.

(56) References Cited

U.S. PATENT DOCUMENTS

| 5,029,084 | A | 7/1991 | Morohasi et al. |
| 7,092,871 | B2 | 8/2006 | Pentheroudakis et al. |
| 7,720,847 | B2 | 5/2010 | Driessen et al. |
| 7,756,847 | B2 | 7/2010 | Pauws et al. |
| RE41,899 | E * | 10/2010 | Rose ................. G06F 17/30699 706/14 |

(Continued)

FOREIGN PATENT DOCUMENTS

| CN | 101246472 | 8/2008 |
| CN | 101655838 | 2/2010 |

(Continued)

*Primary Examiner* — Richard Bowen
(74) *Attorney, Agent, or Firm* — Van Pelt, Yi & James LLP

(57) ABSTRACT

Embodiments of the present application relate to a search method, a system for searching, and a computer program product for searching. A search method is provided. The method includes receiving a query word string, retrieving a plurality of various product information entries related to the query word string, extracting, from a memory, a first core product word from the query word string, extracting, from the memory, second core product words from the various product information entries, for each second core product word, checking a list of candidate product words relating to a key product word for a presence of the each second core product word, in the event that the each second core product word is present, reducing a weighting of the product information entry corresponding to the each second core product word, and sorting the product information entries according to the adjusted weightings of the product information entries.

15 Claims, 11 Drawing Sheets

(56) References Cited

U.S. PATENT DOCUMENTS

| | | | |
|---|---|---|---|
| 8,055,669 B1* | 11/2011 | Singhal | G06F 17/3064 707/765 |
| 8,086,442 B1 | 12/2011 | Wu et al. | |
| 8,301,633 B2 | 10/2012 | Cheslow | |
| 8,321,403 B1* | 11/2012 | Wu | G06F 17/3069 707/713 |
| 8,332,324 B2 | 12/2012 | Fusz et al. | |
| 8,515,968 B1* | 8/2013 | Bayardo | G06Q 30/00 705/14.4 |
| 2002/0157116 A1 | 10/2002 | Jasinschi | |
| 2002/0178158 A1* | 11/2002 | Kanno | G06F 17/30696 |
| 2003/0216905 A1 | 11/2003 | Chelba et al. | |
| 2005/0197829 A1 | 9/2005 | Okumura | |
| 2007/0067098 A1 | 3/2007 | Zelentsov | |
| 2008/0033939 A1* | 2/2008 | Khandelwal | G06F 17/30867 |
| 2008/0077570 A1* | 3/2008 | Tang | G06F 17/30684 |
| 2008/0263019 A1 | 10/2008 | Harrison et al. | |
| 2008/0288243 A1 | 11/2008 | Kobayashi | |
| 2009/0076927 A1 | 3/2009 | Sridhar et al. | |
| 2009/0089277 A1 | 4/2009 | Cheslow | |
| 2009/0228468 A1* | 9/2009 | Qin | G06F 17/30616 |
| 2009/0327313 A1 | 12/2009 | Kung et al. | |
| 2010/0179956 A1* | 7/2010 | Jammalamadaka | G06F 17/30389 707/748 |
| 2010/0278428 A1 | 11/2010 | Terao et al. | |
| 2010/0305947 A1 | 12/2010 | Schwarz et al. | |
| 2011/0093331 A1* | 4/2011 | Metzler | G06F 17/30864 705/14.49 |
| 2011/0184942 A1 | 7/2011 | Jain et al. | |
| 2011/0202330 A1 | 8/2011 | Dai et al. | |
| 2012/0130705 A1* | 5/2012 | Sun | G06F 17/2785 704/9 |
| 2012/0191745 A1* | 7/2012 | Velipasaoglu | 707/767 |
| 2012/0209834 A1* | 8/2012 | Vailaya | G06F 17/30675 707/723 |
| 2012/0239679 A1 | 9/2012 | Gupta | |
| 2012/0317088 A1* | 12/2012 | Pantel | G06F 17/30893 707/706 |
| 2012/0317101 A1 | 12/2012 | Jones et al. | |

FOREIGN PATENT DOCUMENTS

| | | |
|---|---|---|
| JP | H04262460 | 9/1992 |
| JP | H08129554 | 5/1996 |
| JP | H1078969 | 3/1998 |
| JP | 2009295052 | 12/2009 |
| WO | 2008009017 | 1/2008 |
| WO | 2008019007 | 2/2008 |
| WO | 2011028277 | 3/2011 |
| WO | 2011137125 | 11/2011 |

* cited by examiner

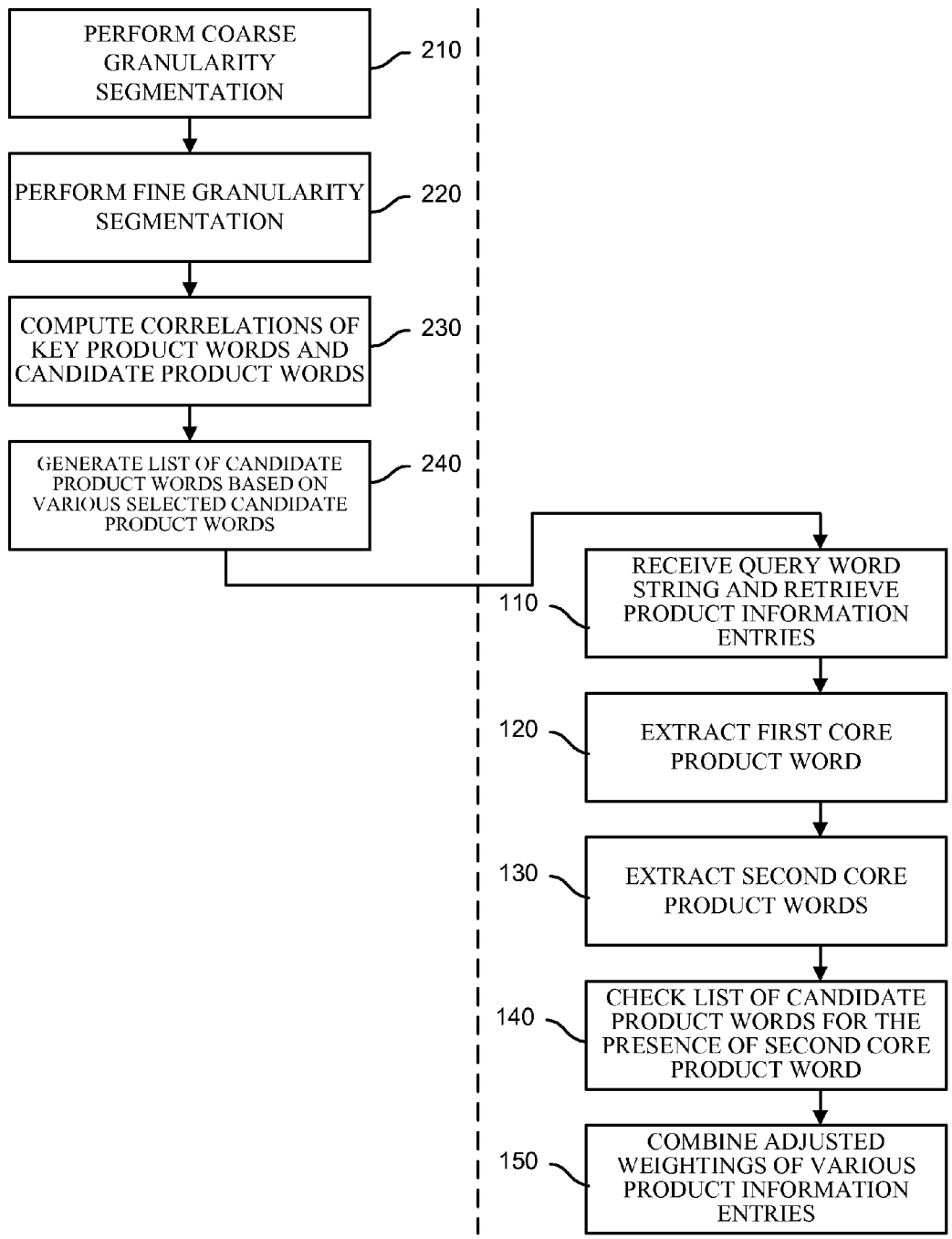
FIG. 1A    100

234

238

PRODUCT SEARCH METHOD AND SYSTEM

CROSS REFERENCE TO OTHER APPLICATIONS

This application claims priority to People's Republic of China Patent Application No. 201210160827.X entitled A SEARCH METHOD AND SYSTEM, filed May 22, 2012 which is incorporated herein by reference for all purposes.

FIELD OF THE INVENTION

The present application involves a search method and system.

BACKGROUND OF THE INVENTION

In a search process and particularly in a search process relating to products, due to different combinations of product words and in response to a certain product word entered by a user, a search engine may return peripheral products which are not highly related to a product relating to the product word entered by the user. For example, in response to the user entering MP3, the number of product word combinations corresponding to MP3 is very large. For example, products such as MP3 download cables and MP3 speakers may be found, but MP3 download cables and MP3 speakers are different products from MP3s. Because traditional searching performs a search based on key product word matching methods, searches can very easily return peripheral products which are relatively loosely related to the product relating to the query word string entered by the user. For example, as described above, if the user enters MP3 as a query word string, MP3 download cables and MP3 speakers have very high weightings in the search results in the search performed by the search engine. In other words, a large number of product information entries having a low correlation to the product corresponding to the query word string are present near the top of sorted product information entries returned by the search engine.

Two conventional technical methods exist to resolve interference by peripheral products having a low correlation to the product relating to the query word string entered by the user, as described above:

In a first technical method, categories are used to avoid a large number of peripheral results being found in the search results. The first technical method typically includes the following: first, based on log information, click through rates of categories corresponding to the user's query word string are tabulated, and then corresponding category tendencies relating to the query word string are determined. Weightings of product information entries which do not belong to the relevant categories are lowered. In other words, the weightings of product information entries contained in the returned search results which do not relate to the relevant categories are lowered.

With this method, substantial problems exist with respect to accuracy. For example, if mobile telephone batteries are placed in the mobile telephone category for purposes of fraud by sellers who distribute product information, peripherals products (mobile telephone batteries) will appear when mobile telephones are searched. Additionally, if a query word string is related to a plurality of categories, when analyzing the tendencies of the categories related to the query word string, if the click through rate of a certain category related to the query word string is very low, then this category can be easily overlooked. Accordingly, it is very difficult for the search engine to recall all categories related to the query word string resulting in a low search accuracy.

In a second technical method, the method includes online manual review of search results. The manual review method is used to determine peripheral word sets corresponding to each product word. In other words, if peripheral words appear in the search results, the method can determine that this product information entry having the peripheral words should not appear in the search results.

Although the accuracy of the manual review method is very high, the method requires the expenditure of a large number of man hours to perform the review, resulting in high labor costs.

BRIEF DESCRIPTION OF THE DRAWINGS

Various embodiments of the invention are disclosed in the following detailed description and the accompanying drawings.

FIG. 1A is a process flow diagram illustrating an embodiment of a search method.

DETAILED DESCRIPTION

Figure 1B:
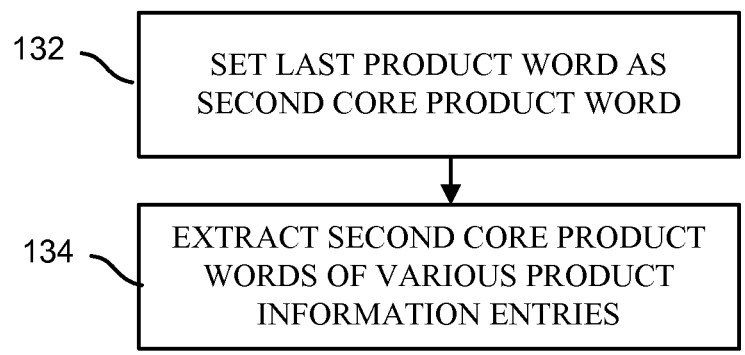
FIG. 1B is a process flow diagram illustrating an embodiment of an establishment of a list of candidate product words method.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task.

As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present application establishes in advance key product words and corresponding candidate product word lists. The candidate product word lists include candidate product words. After the candidate product words and the key product words are combined, synthetic product words obtained and the key product words do not belong to the same categories. For example, "mobile phone" corresponds to a key product and "battery" or "charger" corresponds to a candidate product. A synthetic product corresponds to "mobile phone battery" or "mobile phone charger." Accordingly, the key product and the synthetic product belong to different product categories. Subsequently, according to the query word string entered by the user and various product information entries found based on the query word string, core product words of the query word string are extracted as the key product words, and core product words of the product information entries are extracted as the candidate product words corresponding to the key product words. Also, the candidate product words are searched in the key product words and the corresponding candidate product word lists. In the event that the candidate product words are found, the weightings of the relevant product information entries are lowered, whereupon the product information entries are sorted according to the adjusted weightings of the various product information entries and outputted. In this way, the probability of the appearance of peripheral product information is reduced, and the accuracy and completeness of the product information recalled is increased.

FIG. 1A is a process flow diagram illustrating an embodiment of a search method. The method 100 can be implemented by the system 300 of FIG. 2. The method 100 includes:

In 110, a server receives a query word string and retrieves a plurality of product information entries related to the query word string. A product information entry corresponds to a title of a product, a description of a product, etc.

In 120, the server extracts a first core product word from the query word string. The first core product word corresponds to the smallest semantic unit. For example, the query word string is "mobile phone battery charger" and the extracted first core product word is "charger." In another example, the query word string is "long sleeve chiffon dress" and the extracted first core product word is "dress."

In 130, the server extracts a plurality of second core product words from the retrieved product information entries. The second core product words correspond to the smallest semantic units. For example, a title of product information entry is "providing mobile phone battery charger" and a second core product word is "charger."

In 140, for each second core product word, the server checks a list of candidate product words for the presence of the each second core product word. The first core product word is matched to a key product word to extract the corresponding list of candidate product words. For example, in the event the key product word is "mobile phone," a list of candidate product words related to mobile phone peripherals includes battery, protective cover, charger, decorations, etc. In the event that the each second core product word is present in the list of candidate product words, the server is configured to reduce a weighting of a product information entry corresponding to the each second core product word. The list of candidate product words includes a plurality of candidate product words. After the plurality of candidate product words are combined with a plurality of key product words to obtain a plurality of synthesized product words, the plurality of synthesized product words obtained and the key product words do not belong to the same category. For example, the key product words are "mobile phone," the candidate product word is "battery" or "charger," and the corresponding synthetic product words are "mobile battery" or mobile phone charger." Accordingly, the key product word and the synthetic product words belong to different product categories.

The list of candidate product words will generally be pre-established and the list of candidate product words includes the candidate product words. The key product words are words used to extract the corresponding list of candidate product words. In the event that the first core product word of the query word string of the user is retrieved, the first core product word is matched to a key product word to extract the corresponding list of candidate product words. In some embodiments, a double array tie uses the key product words to extract the corresponding list of candidate product words.

The candidate product words and the key product words do not belong to the same category. Moreover, the key product words do not belong to the same category as the synthesized product words obtained by combining the candidate product words and the key product words.

For example, for MP3 download cables and MP3 earphones, MP3 is used as the key product word, while download cables and earphones are added to the list of candidate product words as candidate product words. MP3s, download cables, and earphones are products that respectively belong to different categories. The words "MP3 download cables," obtained by combining MP3 and download cables, belong to a relevant category for download cables, unlike MP3s. The words "MP3 earphones," obtained by combining MP3 and earphones, belong to the earphones category, unlike MP3s.

In 150, according to the adjusted weightings of the various product information entries, the server sorts and outputs the various product information entries. Using previously described corresponding relationship where a first core product word is extracted from a query word string, in the event that the second core product word of a product information entry appears in the list of candidate product words, the product information entry and the first core product word from the query word string do not belong to the same category and the weight of the product information entry is reduced.

In some embodiments, a candidate rules dictionary for the list of candidate product words corresponding to the key product words is established in advance. In some embodiments, the establishing of the key product words and the corresponding candidate product word lists include:

In 210, for each various product information entry contained in the database, the server performs coarse granularity segmentation on the each various product information entry by the largest semantic units, and extracts third core product words included in the each segmented entry. Please note that the third core product words do not refer to a third core product. The third core product words only refer to product word information in the segmentation result.

Product information is generally structured information. For example, the product information can have structured text such as a title, a summary and a description. All text information of each product information entry is analyzed and core product words are retrieved from the text information. Also, product words are extracted from the text of certain structure, such as, for example, the title, the summary, or the description. In some embodiments, the title information field is analyzed. In some embodiments, other fields are analyzed.

For example, for the title information field of a product information entry retrieved from the database, segmentation is performed on the title information by the largest semantic units to obtain coarse granularity parsed words. The largest semantic units are similar to phrases. In the event that parsed words combine to express a semantic unit, then the parsed words are not segmented. For example, "mobile phone batteries" expresses batteries used in mobile phones. Parsing generally performs maximum matching based on a dictionary. In the event that the dictionary includes a word formed from the smallest semantic unit that identifies a semantic meaning, then the word is regarded as a largest semantic unit. For example, the "mobile phone batteries" refers to batteries used in mobile phones, and not batteries used in other electrical equipment. In another example, "MP3 download cables" refers to download cables for MP3s, and not download cables for other electrical equipment.

After coarse granularity parsing is performed by the largest semantic unit, various word characteristics can be present in the words obtained, such as a modifier, a product word, a model number word, etc. In the example "very pretty Nokia mobile phone N99," "very pretty" corresponds to a modifier, "Nokia mobile phone" corresponds to a product word, and "N99" corresponds to a model number word. In the event that the extracted information is relatively long, as a result, many product words can be obtained through segmentation. Based on the rules of the language, one core product word among the product words can exist. For example, the word can confirm the category to which the product belongs. Thus, the extracted core product words contained in the various words are obtained through the above coarse granularity segmentation, i.e., the third core product words.

Furthermore, in this example, the word characteristics include: CP_CORE (product core words), CP_MODIFIER (product modifiers), XS (general modifiers), PP (brand words), XH (model number words), QH (subdivision words), BL (coordinating conjunctions), and PT (ordinary words). For example, using "supplying mp3/mp4 car transmitters," the word characteristics contained in the example are shown in Table 1. Parsing is performed using the smallest semantic units. In the event that parsing were performed using the largest semantic units, the word characteristics labels would be similar:

TABLE 1

| Parsing (parsed word) | Word characteristics | Importance |
|---|---|---|
| Supplying | FW | 20 |
| Mp3 | CP_MODIFIER | 90 |
| \ | BL | 0 |
| Mp4 | CP_MODIFIER | 90 |
| Car | XS | 40 |
| Transmitter | CP_CORE | 150 |

In actual application, in words from the extracted information on which coarse granularity segmentation has already been performed, the word characteristics for each word is retrieved based on the word characteristics dictionary and certain judgment rules. In the event that a particular word is a core product word, the particular word is reserved as a third core product word, while no follow-up processing is performed on the other words.

In 220, in the event that the third core product words exist, the server performs fine granularity segmentation on the third core product words by the smallest semantic units, and in the event that at least two of the various words obtained by the fine granularity segmentation are product words, the server composition sequences the words and uses a first product word as a key product word, and the last product word as a candidate product word of the key product word.

In some embodiments, during the coarse granularity segmentation, the server obtains core product words that are segmented to the smallest semantic units, and the core product words cannot be further segmented. The smallest semantic unit segmentation is performed on the obtained various third core product words. In the event that a short string A cannot be segmented (the segmentation result is A) using coarse granularity segmentation, but the short string A can be segmented using fine granularity segmentation into A1/A2, and each of the segmented parsed words is a product word, then A1 is considered to be a modifying component of A2. In other words, the product word A1 has the candidate word candidate A2.

Figure 1C:
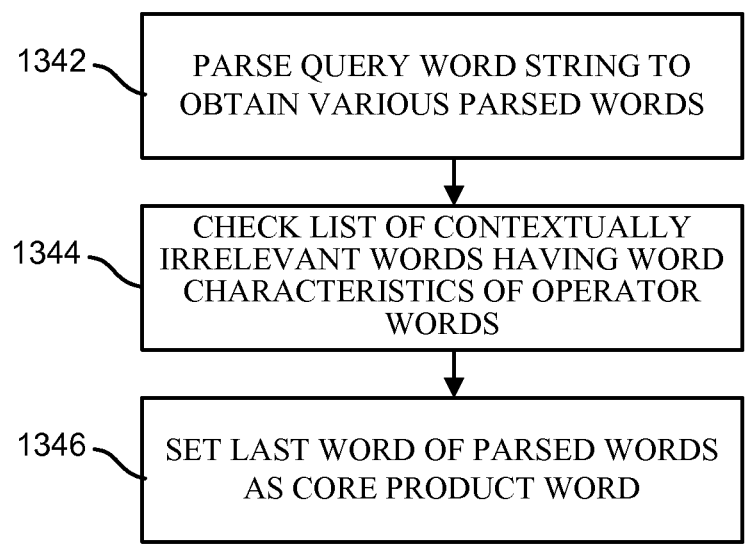
FIG. 1C is a process flow diagram illustrating an embodiment of an obtaining of various core product words method.
Figure 1D:
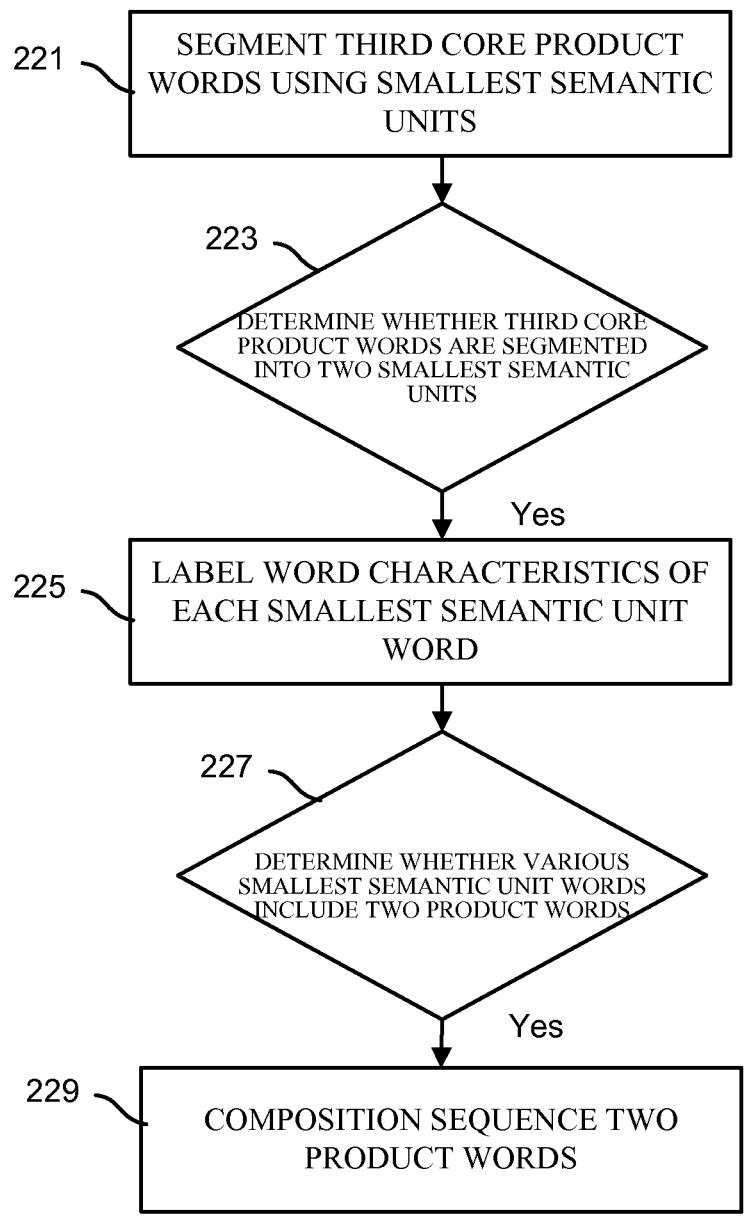
FIG. 1D is a process flow diagram illustrating an embodiment of a fine granularity segmentation method.

FIG. 1D is a process flow diagram illustrating an embodiment of a fine granularity segmentation method. The method is an implementation of operation 220. The method comprises:

In another example, in 221, the server segments the third core product words using the smallest semantic units to obtain the smallest semantic unit words.

For example, the obtained "mobile phone batteries" is segmented into "mobile phone" and "batteries," and the obtained "MP3 download cables" is segmented into "MP3" and "download cables."

In 223, the server determines whether the third core product words are segmented into at least two smallest semantic units.

In 225, in the event that the third core product words are segmented into at least two smallest semantic units, the server labels the word characteristics of each smallest semantic unit word.

For at least a portion of the smallest semantic unit words obtained by segmenting the third core product words, the word characteristics for each smallest semantic unit are labeled. For example, the portion of the smallest semantic unit words are labeled as model number words, product words, etc.

In 227, the server determines whether the various smallest semantic unit words include at least two product words.

In 229, in the event that the various smallest semantic unit words include at least two product words, the server composition sequences the at least two product words and uses a first product word as a key product word and a last product word as a candidate product word of the key product word.

For example, "mobile phone" and "batteries" obtained by segmenting "mobile phone batteries" are both product words. "Mobile phone" is set as a key product word which has a candidate product word "batteries." "MP3" and "download cables" obtained by segmenting "MP3 download cables" are both product words. "MP3" is set as a key product word which has a candidate product word "download cables."

In 230, the server computes correlations of the key product words and the candidate product words, and selects candidate product words having correlations exceeding a threshold value.

In actual application, when new product words appear in the product words formed from the smallest semantic units, the new product words and the smallest semantic unit product words can belong to the same category. For example, "women's apparel" and "dresses" obtained by segmenting "women's apparel dresses" both belong to the "women's apparel" category. Thus, if "dresses" is used as a candidate product word of "women's apparel," then when a user performs a search using "women's apparel" as the core product word, the weighting of the product information entry will be erroneously reduced. The reduction of the weighting of the product information entry can result in an inaccurate search result. Therefore, the correlations between the key product words and the candidate product words obtained are computed. The correlations between the key product words and the candidate product words are compared with a certain threshold value. In the event that the correlation is greater than the certain threshold value, the candidate product word is deleted. This deletion ensures that candidate product words that belong to the same category as the key product word do not appear in the list of candidate product words.

Figure 1E:
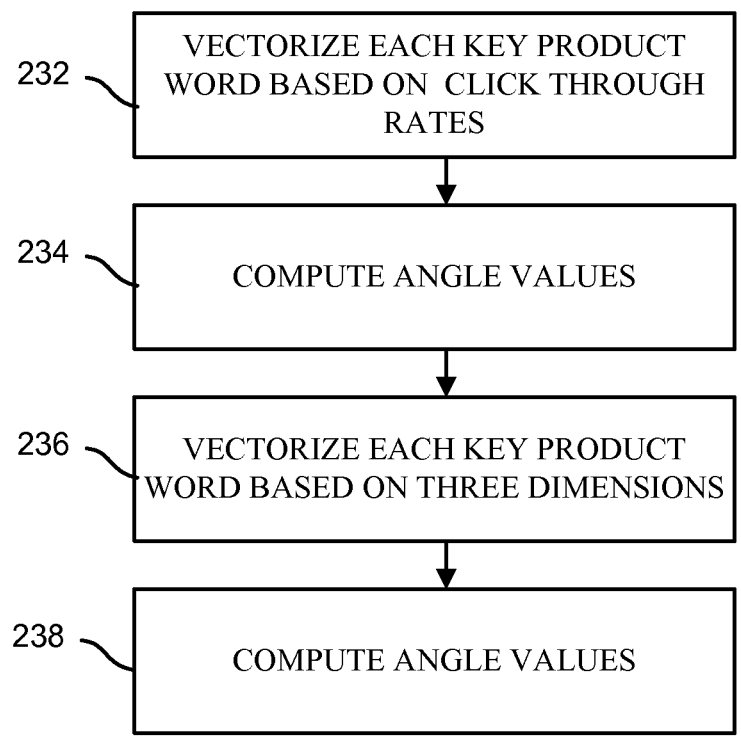
FIG. 1E is a process flow diagram illustrating an embodiment of a correlation computation of key product words method.

FIG. 1E is a process flow diagram illustrating an embodiment of a correlation computation of key product words method. The method is an implementation of operation 230. The method comprises:

In 232, for each key product word and each candidate product word, the server vectorizes the each key product word based on the click through rates for the various categories of the each key product words and vectorizes the each candidate product word based on the click through rates for the various categories of the each candidate product word.

In some embodiments, records of queries exist in a search engine log, where records exist of queries performed based on the key product words and the candidate product words as the query words. Thus, category click through rates for the each key product words and the each candidate product words exist. For example, the total number of clicks for key product word A is m, the number of clicks for category A is m1, the number of clicks for category B is m2, . . . , and the number of clicks for category N is mn. Therefore, the click through rate for key product word A is m1/m, the number of clicks for category B is m2/m, and the click through rate for category N is mn/m. In some embodiments, the list of weightings for key product word A is vectorized as: $\vec{a}$=(m1/m, m2/m, . . . mn/m).

Figure 1F:
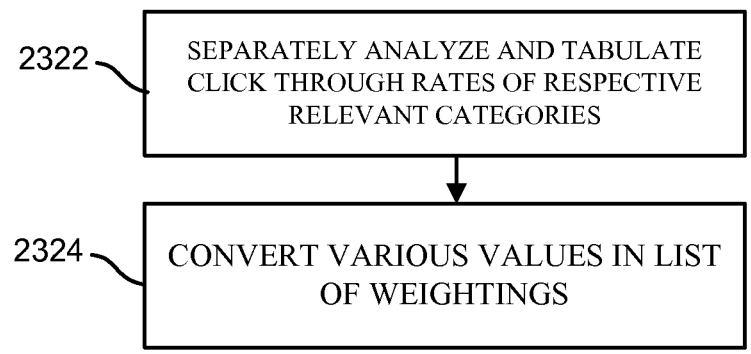
FIG. 1F is a process flow diagram illustrating an embodiment of a vectorization of each key product word and a vectorization of each candidate product word method.

FIG. 1F is a process flow diagram illustrating an embodiment of a vectorization of each key product word and a vectorization of each candidate product word method. The method is an implementation of operation 232. The method comprises:

In 2322, for each key product word and each candidate product word from a search log, the server separately analyzes and tabulates the click through rates of the respective relevant categories to obtain a list of weightings for the relevant categories.

The search log is analyzed to obtain various product information entries clicked in the event that the key product word is the query word, and click through rates for each category are tabulated based on the categories of the various product information entries. The click through rates of the various categories constitute the list of weightings for the relevant categories. The search log is analyzed to obtain the various product information entries clicked when a candidate product word is the query word, and the click through rates for each category are tabulated based on the categories of the various product information entries. The click through rates of the various categories constitute the list of weightings for the relevant categories. Based on the previous example where the total number of clicks for the key product word A is m, the number of clicks for category A is m1, the number of clicks for category B is m2, . . . , and the number of clicks for category N is mn. Therefore, the key product word's click through rate for category A is m1/m, the number of clicks for category B is m2/m, and the click through rate for category N is mn/m. Thus, the list of weightings can be: m1/m, m2/m, . . . , mn/m.

In 2324, the server converts the various values in the list of weightings of the key product words into a first vector, and converts the various values in the list of weightings of the candidate product words into a second vector.

For example, the above list of weightings for key product word A are converted into the vector $\vec{a}$=(m1/m, m2/m, . . . , mn/m). A similar operation is performed on the subsequent candidate product words.

In 234, the server computes angle values between the first vector corresponding to the each key product word and the second vector corresponding to the each candidate product word, and selects a candidate product word having a correlation that meets the threshold value based on a computed angle value.

Figure 1G:
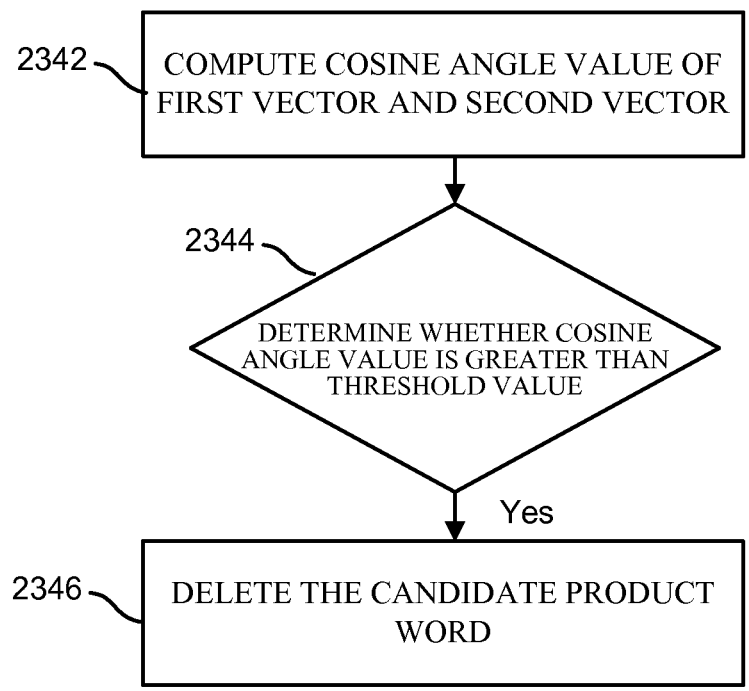
FIG. 1G is a process flow diagram illustrating an embodiment of a computation of an angle value between a first vector and a second vector method.

FIG. 1G is a process flow diagram illustrating an embodiment of a computation of an angle value between a first vector and a second vector method. The method is an implementation of operation 234. The method comprises:

In 2342, the server computes a cosine angle value of the first vector and the second vector. The first vector corresponds to a key product word. The second vector corresponds to a candidate product word.

In 2344, the server determines whether the cosine angle value is greater than the threshold value.

In 2346, in the event that the cosine angle value is greater than the threshold value, the server deletes the candidate product word.

For example, in the event that the vector corresponding to the key product word is $\vec{a}$, and the vector corresponding to the candidate product word is $\vec{b}$, the cosine angle value is:

$$\cos<\vec{a},\vec{b}> = \frac{\vec{a}\cdot\vec{b}}{|\vec{a}||\vec{b}|}.$$

The angle value between the vectors is used as the correlation. In other words, correlations correspond to similarities between the key product words and the candidate product words. The server determines whether a similarity exceeds the threshold. In the event that the similarity exceeds the threshold value of, for example, 0.2, the corresponding candidate product word is deleted.

In some embodiments, the computation of the correlations between the key product words and the candidate product words, and the selection of the candidate product words having correlations that meet the threshold value comprises:

In 236, for each key product word and each candidate product word, the server separately vectorizes the each key product word based on three dimensions of category click through rate, attribute click through rate, and product word click through rate of the each key product word, and separately vectorizes the each candidate product word based on three dimensions of category click through rate, attribute click through rate, and product word click through rate of the each candidate product word.

In some embodiments, the key product words and the candidate product words respectively serve as the query words. The query words are vectorized based on the three dimensions of category, attribute and product word. For example, corresponding to a query word, n product information entries are clicked. Because each product information entry corresponds to a category, product information entries contain m attribute descriptions, and n product words appear in r titles of the product information. The click through rate for each category, the click through rate for each attribute, and the click through rate for each product word under the query word are obtained. The click through rates of the each category, the each attribute, and the each product word are used to compute the cosine angle values of the three dimensions to obtain the correlation.

Figure 1H:
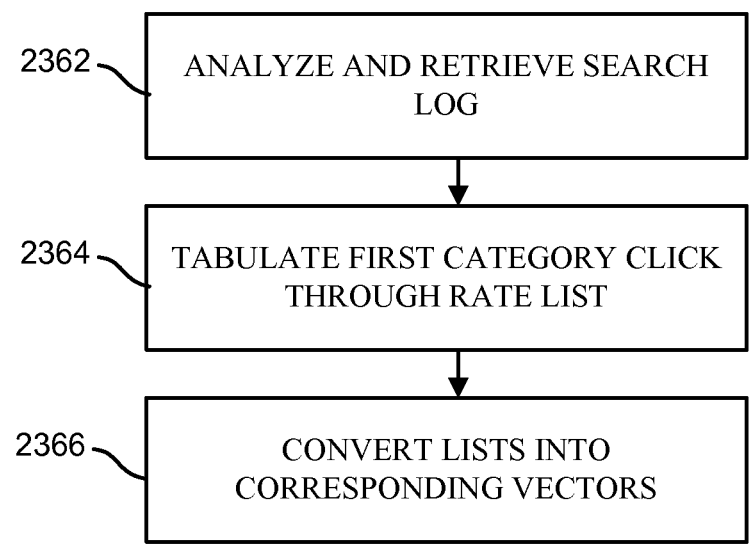
FIG. 1H is a process flow diagram illustrating an embodiment of a vectorization of each key product word and each candidate product word method.

FIG. 1H is a process flow diagram illustrating an embodiment of a vectorization of each key product word and each candidate product word method. The method is an implementation of operation 236. The method comprises:

In 2362, for the each key product word and the each candidate product word, the server separately analyzes and retrieves the search log, and retrieves the various product information entries clicked via the key product words and the various product information entries clicked via the each candidate product word.

As described previously, based on the large number of user query actions, in the historical search logs of the search engine, log records of queries performed using the key product word as the query word or using the candidate product word as the query word generally exist. Separately analyzing and retrieving the search logs, and retrieving the various product information entries clicked via the key product word and the various product information entries clicked via the candidate product words are possible.

In 2364, the server separately tabulates a first category click through rate list corresponding to the key product words, a corresponding first attribute click through list of the various attributes of the various product information entries, and a corresponding first product word click through rate list of the core product words of the various product information entries, and separately tabulates a second category click through rate list corresponding to the candidate product words, a corresponding second attribute click through rate list of the various attributes of the various product information entries, and a second product word click through rate list of the core product words of the various product information entries.

Based on the various product information entries correspondingly clicked via the key product word, the server tabulates the click through rates of the various categories of the key product word to obtain a first category click through rate list, tabulates the click through rates of the various attributes of the various product information entries to obtain a first attribute click through rate list, and tabulates the click through rates of the various product words of the various product information entries to obtain a first product word click through rate list. Based on the various product information entries correspondingly clicked via the candidate product words, the server tabulates the click through rates of the various categories of the candidate product words to obtain a second category click through rate list, tabulates the click through rates of the various attributes of the various product information entries to obtain a second attribute click through rate list, and tabulates the click through rates of the various product words of the various product information entries to obtain a second product word click through rate list.

In 2366, the server separately converts the first category click through rate list, the first attribute click through rate list, the first product word click through rate list, the second category click through rate list, the second attribute click through rate list, and the second product word click through rate list into corresponding vectors.

For example, the first category click through rate list: a1, a2, ..., an, is converted into the vector $\vec{a}=(a1, a2, \ldots, an)$; the first attribute click through rate list: b1, b2, ..., bn, is converted into the vector $\vec{b}=(b1, b2, \ldots, bn)$; the first product word click through rate list: c1, c2, ..., cn, is converted into the vector $\vec{c}=(c1, c2, \ldots, cn)$. Similarly, the obtained vector corresponding to the second category click through rate list is $\vec{e}$, the vector corresponding to the second attribute click through rate list is $\vec{f}$, and the vector corresponding to the second product word click through rate list is $\vec{g}$.

In 238, for each dimension, the server computes angle values between the vectors corresponding to the key product words and the vectors corresponding to the candidate product words, and selects candidate product words having correlations that meet the threshold value based on the obtained angle values of the three dimensions.

For the category dimension, the angle value between the vector $\vec{a}$ corresponding to the first category click through rate list and the vector $\vec{e}$ corresponding to the second category click through rate list is computed. Similarly, for the attribute dimension, the angle value between the vector $\vec{b}$ corresponding to the first attribute click through rate list and the vector $\vec{f}$ corresponding to the second attribute click through rate list is obtained. Similarly, for the product word dimension, the angle value between the vector $\vec{c}$ corresponding to the first product word click through rate list and the vector $\vec{g}$ corresponding to the second product word click through rate list is obtained. Subsequently, based on the angle values of the above three dimensions, candidate product words having correlations that meet the threshold value are selected. For example, the three dimensions of category click through rate correlation, attribute click through rate correlation, and product word click through rate correlation are weighted in a ratio of 6:3:1, respectively.

Figure 1I:
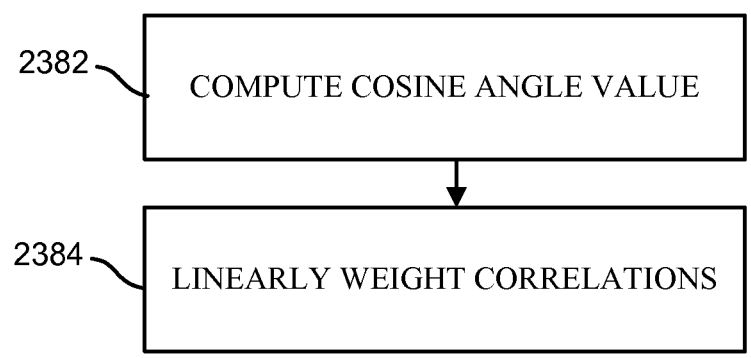
FIG. 1I is a process flow diagram illustrating an embodiment of a computation of angle values between vectors corresponding to the key product words and vectors corresponding to the candidate product words method.

FIG. 1I is a process flow diagram illustrating an embodiment of a computation of angle values between vectors corresponding to the key product words and vectors corresponding to the candidate product words method. The method is an implementation of operation 238. The method comprises:

In 2382, the server separately computes the cosine angle value between the vector corresponding to the first category click through rate list and the vector corresponding to the second category click through rate list to obtain the category click through rate correlation, computes the cosine angle value between the vector corresponding to the first attribute click through rate list and the vector corresponding to the second attribute click through rate list to obtain the attribute click through rate correlation, and computes the cosine angle value between the vector corresponding to the first product word click through rate list and the second product word click through rate list to obtain the product word click through rate correlation.

For example, as described above, the category cosine value obtained is:

$$\cos<\vec{a},\vec{e}>=\frac{\vec{a}\cdot\vec{e}}{|\vec{a}||\vec{e}|},$$

the attribute cosine value obtained is $$\cos<\vec{b},\vec{f}>=\frac{\vec{b}\cdot\vec{f}}{|\vec{b}||\vec{f}|},$$

and the product word cosine value obtained is $$\cos<\vec{c},\vec{g}>=\frac{\vec{c}\cdot\vec{g}}{|\vec{c}||\vec{g}|}.$$

In 2384, the server linearly weights the category click through rate correlation, attribute click through rate correlation, and product word click through rate correlation to obtain an overall similarity of the key product words and the candidate product words. In the event that the overall similarity is greater than the threshold value, the server deletes the candidate product words. For example, the three dimensions of category click through rate correlation, attribute click through rate correlation, and product word click through rate correlation are weighted in a ratio of 6:3:1, respectively.

Whereupon, the server performs an averaging of the linearly weighted above three cosine values to obtain a final cosine value to serve as the correlation, i.e., similarity, between the key product word and the candidate product word. For example, in the event that the similarity is greater than the threshold value, for example, 0.3, the server deletes the candidate product word.

In 240, for the same key product word, the server generates a list of candidate product words based on the various selected candidate product words.

After the extraction and analysis have been performed on the product information entries contained in the database and the correspondences between the key product word and the candidate product words have been obtained, the server generates the related list of candidate product words.

For example, based on the above operations, the list of candidate product words corresponding to the key product word MP3 includes download cables, motherboards, transmission cables, protective sleeves, chargers, rechargeable batteries, sheaths, packaging, packaging boxes, transmitters, speakers, shells, sunglasses, covers, small speakers, small stereos, display racks, carrying pouches, switches, color boxes, mobile phones, wristwatches, amplifiers, station reporters, carrying straps, carrying cords, radios, data cables, connector cables, protective films, loudspeakers, or any combination thereof.

The method combines the use of natural language processing and structured information. Through mixed granularity (coarse granularity segmentation and fine granularity segmentation) mining of product information entries in the database, the method increases the recall rate of peripheral results. By increasing the correlation of category click through information and increasing the correlation of natural language technology and structured information, the method increases the accuracy of results. At the same time, the method is liberated from a reliance on labor costs, and achieves outstanding results in the area of eliminating peripheral results.

Based on the above candidate rules dictionary, which includes lists of key product words and the relevant candidate product words, the searching comprises the following steps:

In 110, the server receives a query word string and retrieves the various product information entries related to the query word string.

The query word string is entered by the user and the search engine receives the query word string, and then retrieves the various product information entries related to the query word string based on the query word string.

In 120, the server extracts a first core product word from the query word string. The first core product word is the smallest semantic unit.

In some embodiments, the server segments the query word string by the smallest semantic units to obtain the first core product word of the product which is the objective expressed by the query word string.

The sequence of the extraction of core words in this operation is not necessarily performed after the various product information entries related to the query word string have been retrieved. In some embodiments, the sequence of the extraction of core words also proceeds simultaneously with or before such retrieval. The sequence of the extraction of core words is not limited by the present application.

In 130, the server extracts various second core product words from the various product information entries. The second core product words are the smallest semantic units.

The server performs segmentation by the smallest semantic units on the various product information entries to obtain the first core product word of the product which is the objective expressed by the query word string. In some embodiments, the segmentation is performed on the titles of the various product information entries.

FIG. 1B is a process flow diagram illustrating an embodiment of an establishment of a list of candidate product words method. The method is an implementation of operation 130. The method comprises:

In 132, the server sets the last product word as a second core product word from the product information entry, and saves the product information entry to which the second core product word corresponds.

In the event that the various second core product words from the various product information entries are extracted, the extraction includes:

In 134, the server extracts the second core product words from the various product information entries from the memory.

When the methods of operations 132 and 134 are used to extract the various second core product words from the various product information entries, only the extraction of the second core product words of the various product information entries from the memory is necessary. The operations 132 and 134 reduce the segmentation processing of the search engine and increase the efficiency of the search engine.

In some embodiments, the extraction is performed when each product information entry is retrieved by the search engine, or the extraction is performed after all product information entries have been retrieved. The extraction is not limited by the present application.

In 140, for each second core product word, the server checks the list of candidate product words for the presence of the second core product word. The first core product word is matched to a key product word to extract a corresponding list of candidate product words. In the event that the second core product word is present, the server reduces the weighting of the product information entry corresponding to the second core product word. The list of candidate product words contains candidate product words. After the server combines the candidate product words with the key product words, the server obtains the synthesized product words and the key product words do not belong to the same category.

For example, for the first core product word "MP3," in the event that the second core product word of one of the corresponding product information entries is "download cables," the server matches "MP3" to the relevant key word "MP3," and checks the list of candidate words corresponding to the key word "MP3" for the presence of "download cables." In the event that "download cables" is present, the server reduces the weighting of the relevant product information entry.

In 150, According to the adjusted weightings of the various product information entries, the server sorts and outputs the various product information entries.

Search engines generally search based on word strings. For example, for "MP3," a search will find "MP3 download cables," but "MP3 download cables" and "MP3" do not belong to the same category. Therefore, in order to increase the accuracy of search results, i.e., to increase the accuracy of the first several pages when the search results are displayed, a reduction in the weighting of the product information entry corresponding to "MP3 download cables" is necessary, so that the search results relating to "MP3 download cables" is pushed back or displayed lower in the sorted results, and the displaying of product information entries belonging to the same category as "MP3" are given a higher priority.

In some embodiments, the correlations between the various product information entries and the query words are first divided into categories based on correlation. Within the categories, the weightings are set based on the quality of information, the forecasted CTR (click through rate), the GMV (gross merchandise volume), other market mechanisms (such as member rotation), or any combination thereof. The server combines the weightings of the various adjusted product information entries, and sorts and outputs the various product information entries.

FIG. 1C is a process flow diagram illustrating an embodiment of an obtaining of various core product words method. The method is an implementation of operation 134. The method comprises:

In 1342, the server parses the query word string or product information entry text to obtain various parsed words, and labels the word characteristics of the various parsed words.

In actual application, for a product information entry, the word characteristics of the parsed words may include: CP_CORE (product core words), CP_MODIFIER (product modifiers), XS (general modifiers), PP (brand words), XH (model number words), QH (subdivision words), BL (coordinating conjunctions), PT (ordinary words), or any combination thereof. Examples are as shown in the above Table 1.

Thus, by parsing the query word strings for various product information entries or query product information entries, the server labels the word characteristics of each parsed word according to the word characteristics described above. In 1344, the server checks the list of contextually irrelevant words having the word characteristics of operator words to identify the coordinating conjunctions contained therein, and segments the query word string or product information entry based on the coordinating conjunctions.

For each parsed word, the server checks the list of contextually irrelevant words having the word characteristics of operator words to identify the coordinating conjunctions contained therein, after which the server segments short strings based on the coordinating conjunctions and computes contextually relevant word characteristics within each segment. For example, the server segments the previously stated "supplying mp3/mp4 car transmitters" into "supplying mp3 car transmitters" and "supplying mp4 car transmitters." MP3, MP4, and transmitters are the product words.

In 1346, in the event that at least two parsed words in the segment have the word characteristics of a product word, the server sets the last word of the parsed words as a core product word.

Based on the BL word characteristics, the server segments short strings and separately computes the word characteristics and importance of each segment of parsed words. For each segment, in the event that a plurality of parsed words within the segment have CP (core product) word characteristics, the server sets the word characteristics of the last of these parsed words to CP_CORE, and sets the word characteristics of the remaining words to CP_MODIFIER. The server scores parsed word importance based on word characteristics, as follows:

For example, the server retrieves the independent score for this word from the IDF (independent) dictionary. In the event that the word is not present in the dictionary, the score is 0.

In the event that the word is the last word, the server adds 10 points and computes the current score.

In the event that the word is a core product word, the server adds 100 points.

In the event that the word is a brand word, the server adds 80 points.

In the event that the word is a model number word, the server adds 60 points.

In the event that the word is a product modifier, the server adds 40 points.

In the event that the word is a subdivision word, the server adds 20 points.

In the event that the word qualifies as a coordinating conjunction or is a left or right parenthesis, the server directly sets the score to 0 points.

In the event that the word is an ordinary word, the server adds 5 points.

Additionally, in the event that the category id and supplier id corresponding to the product information have been provided in the product information, multidimensional characteristic association (supplier levels, category levels, buyer levels, candidate rules) determinations are used to optimize the results and obtain the final parsed word characteristic and importance results.

Four characteristics are extracted from each parsed CP_CORE and CP_MODIFIER word—the category click through corresponding to the parsed word, the product word distribution of product information in its category, the supplier's primary industry, and the supplier's main products, and the performance under these four characteristics of each candidate parsed word is verified.

| Characteristic | Data used | Relevancy standard | Irrelevancy standard |
| --- | --- | --- | --- |
| 1) Category click through corresponding to the parsed word | Category click through dictionary | Corresponding click through rate for this category is greater than 0.05 | Corresponding click through rate for this category is less than 0.05 |
| 2) Category product word distribution | Product words under the category | Frequency of this product word under this category/frequency of the most frequently appearing product word under this category >=0.01 | Frequency of this product word under this category/frequency of the most frequently appearing product word under this category <0.01. |
| 3) Supplier's primary industry | Company library information | Parsed words consistent with supplier's primary industry | Parsed word inconsistent with supplier's primary industry |
| 4) Supplier's main products | Company library information | Parsed words consistent with industry corresponding to supplier's main products | Parsed words inconsistent with industry corresponding to supplier's main products |

In the characteristic fitting portion, in the event that all of the characteristics from characteristics 1) through 4) are relevant, the CP_MODIFIER is upgraded to CP_CORE. In the event that all of the characteristics from characteristics 1) through 4) are irrelevant, the CP_CORE is downgraded to CP_MODIFIER. In the event that all of the characteristics from characteristics 1) through 4) are relevant, the parsed word is set as a trusted word and the candidate rule words corresponding to the word are all set to CP_MODIFIER. Furthermore, the importance score corresponding to the parsed word is modified to obtain the final results.

Figure 2:
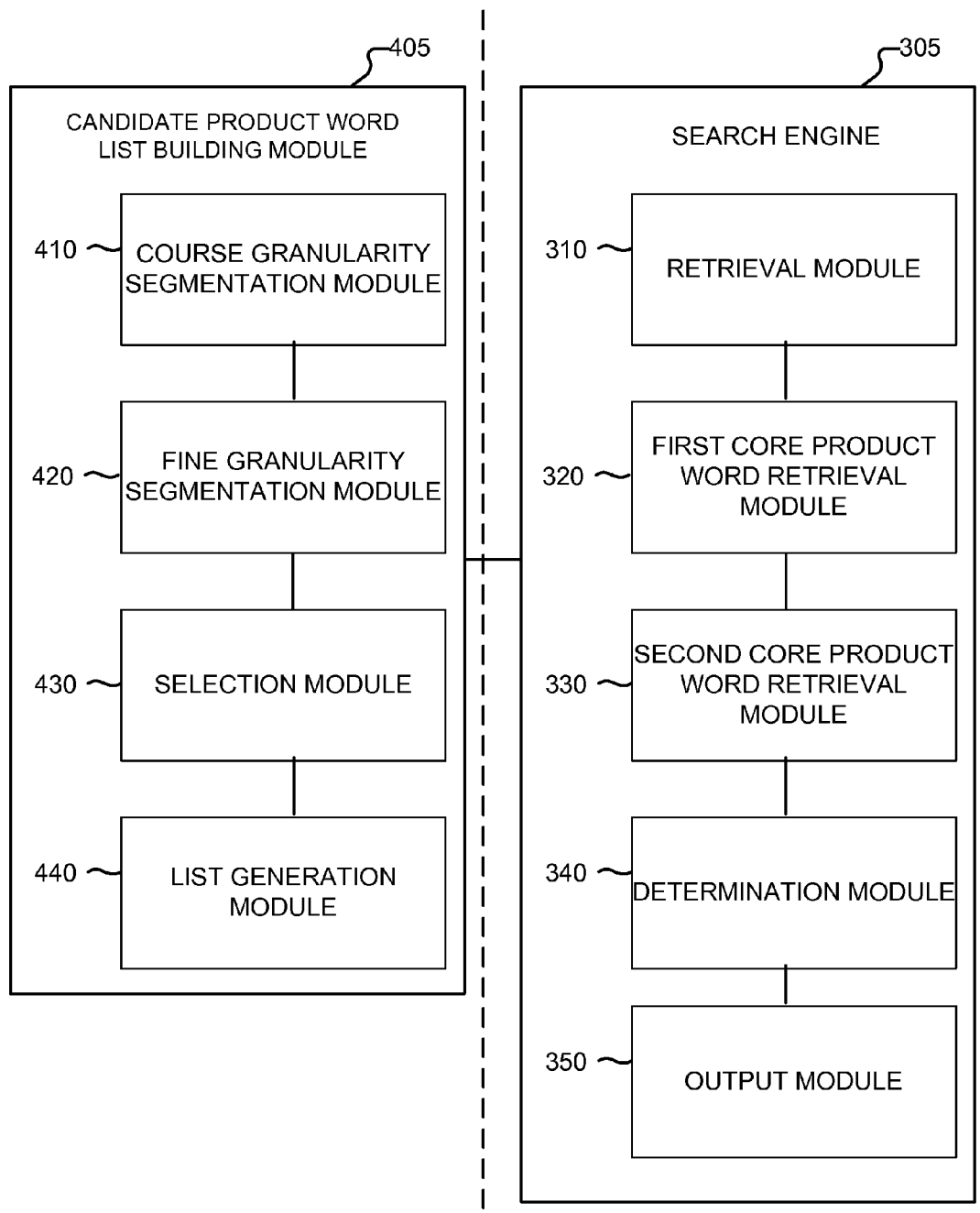
FIG. 2 is a structural schematic diagram illustrating an embodiment of a search system.

FIG. 2 is a structural schematic diagram illustrating an embodiment of a search system. The system 300 includes a search engine 305 and a candidate product word list building module 405.

The search engine 305 includes a retrieval module 310, a first core product word retrieval module 320, a second core product word retrieval module 330, a determination module 340, and an output module 350.

The retrieval module 310 receives a query word string and retrieves various product information entries related to the query word string.

The first core product word retrieval module 320 extracts a first core product word from the query word string. The first core product word corresponds to the smallest semantic unit.

The second core product word retrieval module 330 extracts various second core product words from the various product information entries. The second core product words correspond to the smallest semantic units.

The determination module 340, for each second core product word in the rules dictionary, checks a list of candidate product words corresponding to the key product word for the presence of the second core product word. The first core product word is matched to the key product word to extract the corresponding list of candidate product words. In the event that the second core product word is present, the determination module 340 reduces the weighting of the product information entry corresponding to the second core product word. The list of candidate product words includes candidate product words. After the candidate product words are combined with the key product words, the synthetic words obtained and the key product word do not belong to the same category.

The output module 350 sorts and outputs the various product information entries according to the adjusted weightings of the various product information entries.

The candidate product word list building module 405 includes a coarse granularity segmentation module 410, a fine granularity segmentation module 420, a selection module 430, and a list generation module 440.

The coarse granularity segmentation module 410, for each various product information entry contained in the database, performs coarse granularity segmentation by the largest semantic units to produce segmented results, and extracts third core product words contained in the segmented results.

The fine granularity segmentation module 420 determines whether the third core product words have been extracted. In the event that the third core product words have been extracted, for each third core product word, a fine granularity segmentation is performed to obtain various words, where the words obtained are smallest semantic units. And in the event that the various words obtained contain at least two product words, then in accordance with the composition sequence of the words, the first word is used as a key product word, and the last word is used as a candidate product word of the key product word.

The selection module 430 computes correlations between the key product words and candidate product words, and selects candidate product words having correlations that meets a threshold value.

The list generation module 440, for the same key product word, generates a list of candidate product words for the key product word based on the selected various candidate product words.

Figure 3:
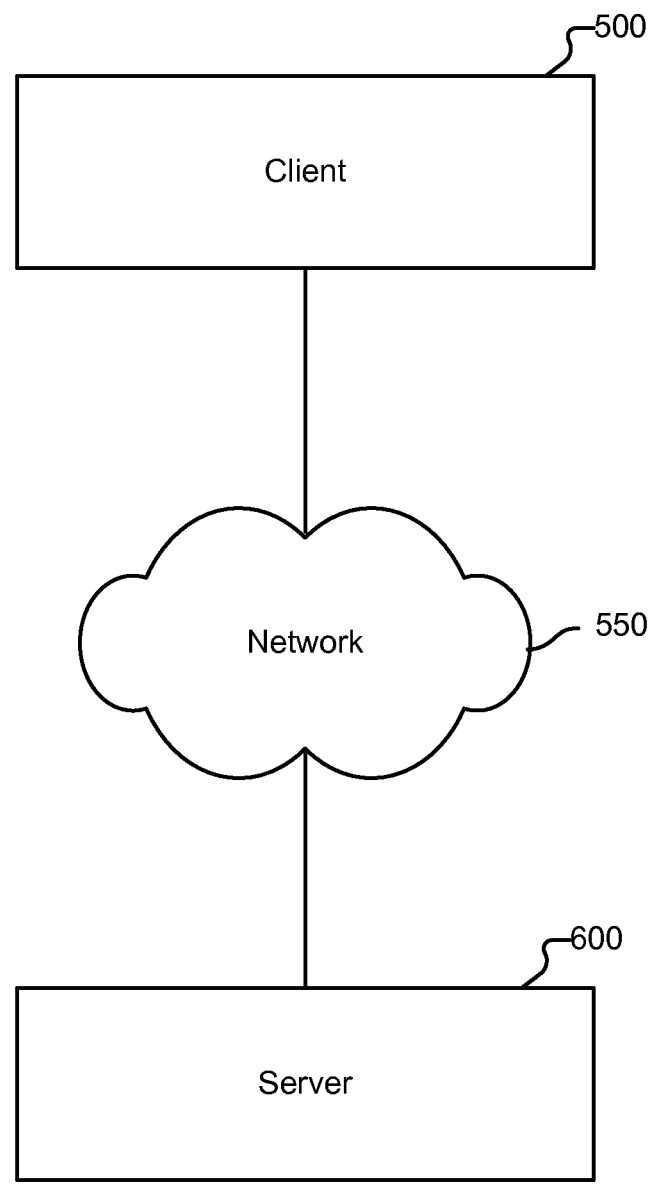
FIG. 3 is a schematic diagram illustrating an embodiment of a search system.

FIG. 3 is a schematic diagram illustrating an embodiment of a search system. The search system 400 comprises a client 500 connected to a server 600 via a network 550. The server 600 can be an implementation of system 300.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A search method, comprising:
   receiving a query word string;
   retrieving a plurality of product information entries related to the query word string;
   extracting, from a memory, a first core product word from the query word string to obtain a first key product word, the first core product word being a smallest semantic unit;
   extracting, from the memory, a plurality of second core product words from the product information entries, the plurality of second core product words being smallest semantic units, wherein the extracting of the plurality of second core product words comprises:
      extracting last product words from the plurality of product information entries, the plurality of second core product words including the last product words, the plurality of product information entries corresponding to titles of products, descriptions of products, or a combination thereof;
   for a first second core product word, checking a list of candidate product words relating to the first key product word for a presence of the first second core product word;
   in the event that the first second core product word is present in the list of candidate product words, reducing a weighting of the product information entry corresponding to the first second core product word, wherein the list of candidate product words contains a first candidate product word, the first candidate product word relating to the first second core product word, wherein the first candidate product word is combined with the first key product word to obtain a synthesized product word, and wherein the first key product word and the synthesized product word do not belong to the same category; and
   sorting and outputting the product information entries according to the reduced weightings of the product information entries.

2. The method as described in claim 1, further comprising:
   establishing the list of candidate product words comprises:
      for at least one product information entry contained in a database:
         performing a coarse granularity segmentation by the largest semantic units; and
         extracting a third core product word contained in segmented results;
      determining whether the third core product word has been extracted from the segmented results;
      in the event that the third core product word has been extracted from the segmented results, performing a fine granularity segmentation by the smallest semantic units:
         determining whether at least two of the words obtained are product words;
         in the event that at least two of the words obtained are product words;
         using the first product word as a key product word; and
         using the last product word as a candidate product word of the key product word;
      computing correlations of at least one key product word and at least one candidate product word;
      determining whether the correlation of the at least one key product word and the at least one candidate product word meets a threshold value;
      selecting a candidate product word having a correlation that meets the threshold value; and
      for the same key product word, generating the list of candidate product words based on the selected candidate product word.

3. The method as described in claim 2, wherein the computing of the correlations of the at least one key product word and the at least one candidate product word, the determining whether the correlation of the at least one key product word and the at least one candidate product word meets the threshold value, and the selecting of the candidate product word having the correlation that meets the threshold value comprises:
   for the at least one key product word and the at least one candidate product word:
      vectorizing the at least one key product word based on a click through rate for a category of the at least one key product word to obtain a vector; and
      vectorizing the at least one candidate product word based on a click through rate for a category of the at least one candidate product word to obtain a vector;
   computing angle values between the vectors corresponding to the key product words and the vectors corresponding to the candidate product words;
   computing correlations between the angle values;
   determining whether at least one candidate product word having a correlation meets a threshold value based on an angle value; and selecting a candidate product word having the correlation that meets the threshold value based on the angle value.

4. The method as described in claim 3, wherein for the at least one key product word and the at least one candidate product word, the vectorizing of the at least one key product word using the click through rate for the category of the key product word to obtain the vector, and the vectorizing of the at least one candidate product word using the click through rate for the category of the at least one candidate product word to obtain the vector comprises:

for the at least one key product word and the at least one candidate product word, from a search log, separately analyzing and tabulating the click through rates of respective relevant categories to obtain a list of weightings for a relevant category;

converting various values in the list of weightings of the at least one key product word into the vector; and converting various values in the list of weightings of the at least one candidate product words into the vector.

5. The method as described in claim 4, wherein the computing of the angle values between the vectors corresponding to the at least one key product word and the vectors corresponding to the at least one candidate product word, and the selecting of the candidate product word having the correlation that meets the threshold value based on the angle value comprises:

computing a cosine angle value of the vectors;

determining whether the cosine angle value is greater than the threshold value; and in the event that the cosine angle value is greater than the threshold value, deleting the candidate product word.

6. The method as described in claim 2, wherein the using of the last product word as the candidate product word of the key product word comprises:

setting the last product word as a second core product word of a relevant product information entry; and storing the corresponding product information entry.

7. The method as described in claim 6, wherein the extracting of the second core product words corresponding to the product information entries comprises:

extracting the second core product words of the product information entries from the memory.

8. The method as described in claim 2, wherein:

the computing correlations of the at least one key product word and the at least one candidate product word comprises:

vectorizing the at least one key product word based on a category click through rate, an attribute click through rate, and a product word click through rate of the each key product word;

vectorizing the at least one candidate product word based on the category click through rate, the attribute click through rate, and the product word click through rate of the at least one candidate product word; and computing an angle value between the vector corresponding to the at least one key product word and the vector corresponding to the at least one candidate product word; and the selecting of the candidate product word having the correlation that meets the threshold value comprises:

determining whether the at least one candidate product word has the correlation meeting the threshold value based on the obtained angle value; and selecting the candidate product word having the correlation meeting the threshold value.

9. The method as described in claim 1, wherein the extracting of the second core product words comprises:

parsing the query word string or product information entry text to obtain parsed words;

labeling word characteristics of the parsed words;

checking a list of contextually irrelevant words having word characteristics of operator words to identify coordinating conjunctions contained in the list of contextually irrelevant words;

segmenting the query word string or product information entry text based on the coordinating conjunctions; and for each segment of the query word string:

determining whether the each segment contains at least two parsed words which have a word characteristic of a product word; and in the event that the each segment contains the at least two parsed words which have the word characteristic of the product word, setting the word characteristic of the last of these parsed words as a core product word.

10. A search method, comprising:

receiving a query word string;

retrieving a plurality of product information entries related to the query word string;

extracting, from a memory, a first core product word from the query word string to obtain a first key product word, the first core product word being a smallest semantic unit;

extracting, from the memory, a plurality of second core product words from the product information entries, the plurality of second core product words being smallest semantic units;

for each second core product word, checking a list of candidate product words relating to the first key product word for a presence of a first second core product word;

in the event that the each second core product word is present in the list of candidate product words, reducing a weighting of the product information entry corresponding to the first second core product word, wherein the list of candidate product words contains a first candidate product word, the first candidate product word relating to the first second core product word, wherein the first candidate product word is combined with the first key product word to obtain a synthesized product word, and wherein the first key product word and synthesized product word do not belong to the same category;

sorting and outputting the product information entries according to the reduced weightings of the product information entries;

establishing the list of candidate product words, comprising:

for each product information entry of product information entries contained in a database:

performing a coarse granularity segmentation by the largest semantic units; and extracting a third core product word contained in segmented results;

determining whether the third core product word has been extracted from the segmented results;

in the event that the third core product word has been extracted from the segmented results, performing a fine granularity segmentation by the smallest semantic units:

determining whether at least two of the words obtained are product words;

in the event that at least two of the words obtained are product words;
designating the first product word of the product words as a key product word; and
designating the last product word of the product words as a candidate product word of the key product word;
computing correlations of each key product word and each candidate product word, comprising:
for the each key product word and the each candidate product word:
separately vectorizing each key product word using three dimensions of a category click through rate, an attribute click through rate, and a product word click through rate of the each key product word; and
separately vectorizing each candidate product word using the three dimensions of the category click through rate, the attribute click through rate, and the product word click through rate of the each candidate product word; and
for each dimension, computing an angle value between the vector corresponding to the each key product word and the vector corresponding to the each candidate product word for the three dimensions;
determining whether the correlation of the each key product word and the each candidate product word meets a threshold value;
selecting a candidate product word having a correlation that meets the threshold value, comprising:
determining whether the each candidate product word having a correlation meeting the threshold value based on the obtained angle values of the three dimensions; and
selecting a candidate product word having the correlation meeting the threshold value;
for the same key product word, generating the list of candidate product words based on the selected candidate product word.

11. The method as described in claim 10, wherein for the each key product word and the each candidate product word, the vectorizing of the each key product word using the three dimensions of the category click through rate, the attribute click through rate, and the product word click through rate of the each key product word, and the vectorizing of the each candidate product word using the three dimensions of the category click through rate, the attribute click through rate, and the product word click through rate of the each candidate product word comprises:
for the each key product word and the each candidate product words:
analyzing and retrieving a search log; and
retrieving the product information entries clicked via the each key product word and the each product information entry clicked via the candidate product word;
tabulating a first category click through rate list corresponding to the key product words, a corresponding first attribute click through list of attributes of the product information entries, and a corresponding first product word click through rate list of the core product words of the product information entries;
tabulating a second category click through rate list corresponding to the candidate product words, a corresponding second attribute click through rate list of attributes of the product information entries, and a second product word click through rate list of the core product words of the product information entries; and
converting the first category click through rate list, the first attribute click through rate list, the first product word click through rate list, the second category click through rate list, the second attribute click through rate list, and the second product word click through rate list into corresponding vectors.

12. The method as described in claim 11, wherein for each dimension, the computing of the angle value between the vector corresponding to the each key product word and the vector corresponding to the each candidate product word, and the selecting of the candidate product word having the correlation that meets the threshold value based on the obtained angle values of the three dimensions comprises:
computing a cosine angle value between the vector corresponding to the first category click through rate list and the vector corresponding to the second category click through rate list to obtain a category click through rate correlation;
computing a cosine angle value between the vector corresponding to the first attribute click through rate list and the vector corresponding to the second attribute click through rate list, to obtain an attribute click through rate correlation;
computing a cosine angle value between the vector corresponding to the first product word click through rate list and the second product word click through rate list to obtain the product word click through rate correlation;
linearly weighting of the category click through rate correlation, the attribute click through rate correlation, and the product word click through rate correlation to obtain an overall similarity of the key product words and the candidate product words;
determining whether the overall similarity is greater than a threshold value; and
in the event that the overall similarity is greater than the threshold value, deleting the candidate product words.

13. A system for searching, comprising:
at least one processor configured to:
receive a query word string;
retrieve a plurality of product information entries related to the query word string;
extract a first core product word from the query word string to obtain a first key product word, the first core product word being a smallest semantic unit;
extract a plurality of second core product words from the product information entries, the second core product words being smallest semantic units, wherein the extracting of the plurality of second core product words comprises to:
extracting last product words from the plurality of product information entries, the plurality of second core product words including the last product words, the plurality of product information entries corresponding to titles of products, descriptions of products, or a combination thereof;
for a first second core product word, check a list of candidate product words relating to the first key product word for a presence of the first second core product word;
in the event that the first second core product word is present in the list of candidate product words, reduce a weighting of the product information entry corresponding to the first second core product word, wherein the list of candidate product words contains a first candidate product word, the first candidate product word relating to the first second core product word, wherein the first candidate product word is combined with the first key product word to obtain a synthesized product word, and wherein the first key product word and the synthesized product word do not belong to the same category; and sort and output the product information entries according to the reduced weightings of the product information entries; and a memory coupled to the at least one processor and configured to provide the at least one processor with instructions.

14. The system as described in claim 13, wherein the at least one processor is further configured to:

establish the list of candidate product words comprises:

for at least one product information entry contained in a database:

perform a coarse granularity segmentation by the largest semantic units; and extract a third core product word contained in segmented results;

determine whether the third core product word has been extracted from the segmented results;

in the event that the third core product word has been extracted from the segmented results, perform a fine granularity segmentation by the smallest semantic units:

determine whether at least two of the words obtained are product words;

in the event that at least two of the words obtained are product words;

use the first product word as a key product word; and use the last product word as a candidate product word of the key product word;

compute correlations of at least one key product word and at least one candidate product word;

determine whether the correlation of the at least one key product word and the at least one candidate product word meets a threshold value;

select a candidate product word having a correlation that meets the threshold value; and for the same key product word, generate the list of candidate product words based on the selected candidate product word.

15. A computer program product for searching, the computer program product being embodied in a non-transitory computer readable storage medium and comprising computer instructions for:

receiving a query word string;

retrieving a plurality of product information entries related to the query word string;

extracting, from a memory, a first core product word from the query word string to obtain a first key product word, the first core product word being a smallest semantic unit;

extracting, from the memory, a plurality of second core product words from the product information entries, the second core product words being smallest semantic units, wherein the extracting of the plurality of second core product words comprises:

extracting last product words from the plurality of product information entries, the plurality of second core product words including the last product words, the plurality of product information entries corresponding to titles of products, descriptions of products, or a combination thereof;

for a first second core product word, checking a list of candidate product words relating to the first key product for a presence of the first second core product word;

in the event that the first second core product word is present in the list of candidate product words, reducing a weighting of the product information entry corresponding to the first second core product word, wherein the list of candidate product words contains a first candidate product word, the first candidate product word relating to the first second core product word, wherein the first candidate product word is combined with first key product word to obtain a synthesized product word, and wherein the first key product word and the synthesized product word do not belong to the same category; and sorting and outputting the product information entries according to the reduced weightings of the product information entries.

* * * * *